(12) United States Patent
Wang et al.

(10) Patent No.: US 8,285,018 B2
(45) Date of Patent: Oct. 9, 2012

(54) METHOD FOR RECONSTRUCTING COLOR IMAGES

(75) Inventors: Hsiang-Chen Wang, Minhsiung Township (TW); Fu-Jie Hsu, Minhsiung Township (TW); Zih-Hao Ye, Minhsiung Township (TW); Fang-Hsuan Cheng, Minhsiung Township (TW)

(73) Assignee: National Chung Cheng University, Chiayi County (TW)

( * ) Notice: Subject to any disclaimer, the term of this patent is extended or adjusted under 35 U.S.C. 154(b) by 365 days.

(21) Appl. No.: 12/659,242

(22) Filed: Mar. 2, 2010

(65) Prior Publication Data

US 2011/0216971 A1 Sep. 8, 2011

(51) Int. Cl.
G06K 9/00 (2006.01)
G06K 9/40 (2006.01)
(52) U.S. Cl. ........................ 382/128; 382/254
(58) Field of Classification Search .................. None
See application file for complete search history.

(56) References Cited

U.S. PATENT DOCUMENTS

| 6,885,394 | B1 * | 4/2005 | Noguchi | 348/223.1 |
| 7,728,904 | B2 * | 6/2010 | Quan et al. | 348/349 |
| 2007/0242293 | A1 * | 10/2007 | Owens | 358/1.9 |

OTHER PUBLICATIONS

Y. Murakami et al. "Spectral reflectance estimation from multiband image using color chart", Opt. Comm. 2001.*

* cited by examiner

*Primary Examiner* — Li Liu
(74) *Attorney, Agent, or Firm* — Bacon & Thomas, PLLC

(57) ABSTRACT

A method for reconstructing color images has steps of using a spectrum-acquiring device to acquire spectral data of a plurality of sample color blocks and calculating coefficients of a basis matrix of the sample color blocks; obtaining digital counts of the plurality of sample color blocks with a digital camera; obtaining a conversion matrix in accordance with the coefficients of the basis matrix and the digital counts; acquiring digital counts of an original image with the digital camera, and generating a reconstructed image in accordance with the digital counts of the original image and the conversion matrix; and varying the conversion matrix in accordance with a new light source, and computing to generate a reconstructed image corresponding to the new light source in accordance with the digital counts of the original image and the varied conversion matrix.

8 Claims, 11 Drawing Sheets

| | 1 | 2 | 3 | 4 | 5 | 6 | 7 | 8 | 9 | 10 | 11 | 12 |
|---|---|---|---|---|---|---|---|---|---|---|---|---|
| | 28.1131 | 15.8218 | 54.3871 | 17.4501 | 48.7199 | 36.2153 | 75.1960 | 96.8251 | 44.7254 | 39.6606 | 67.0518 | 70.1721 |

| | 13 | 14 | 15 | 16 | 17 | 18 | 19 | 20 | 21 | 22 | 23 | 24 |
|---|---|---|---|---|---|---|---|---|---|---|---|---|
| | 28.1131 | 15.8218 | 54.3871 | 17.4501 | 48.7199 | 36.2153 | 75.1960 | 96.8251 | 44.7254 | 39.6606 | 67.0518 | 70.1721 | 46.0793 |

FIG. 6

| | | |
|---|---|---|
| 1 | | 28.1131 |
| 2 | | 10.2079 |
| 3 | | 7.3362 |
| 4 | | 6.4915 |
| 5 | | 13.0652 |
| 6 | | 2.6355 |
| 7 | | 15.0959 |
| 8 | | 14.3448 |
| 9 | | 18.0102 |
| 10 | | 12.7235 |
| 11 | | 24.5987 |
| 12 | | 13.0268 |

| | | |
|---|---|---|
| 13 | | 18.1373 |
| 14 | | 3.9303 |
| 15 | | 9.7936 |
| 16 | | 8.8166 |
| 17 | | 23.7448 |
| 18 | | 26.9718 |
| 19 | | 0.3446 |
| 20 | | 0.4444 |
| 21 | | 0.6063 |
| 22 | | 0.8761 |
| 23 | | 1.4840 |
| 24 | | 3.1555 |
| | ΔE | 10.3282 |

FIG. 7

METHOD FOR RECONSTRUCTING COLOR IMAGES

BACKGROUND OF THE INVENTION

1. Field of the Invention

The present invention is related to a method for reconstructing color images, and more particularly to a method that varies pixels in original digital color images according to spectra of replaceable light sources to reconstruct color images with different visual effect.

2. Description of the Related Art

Clinically, most regular light sources pertain to tungsten lamp, xenon lamp, halogen lamp, and the like. In contrast to the aforementioned light sources, light-emitting diode (LED) lamps are advantageous due to lower power consumption, high emitting efficiency, durability, environmental protection, compact size, adjustable light intensity, and abundant color gamut.

As to biological medicine, there are plenty of related researches and equipment using various multi-spectral light sources to generate different biological images. Such biological images serve as references to medical personnel for determining if a diagnostic area has any abnormal pathological change.

Given enterovirus as an example, pathological changes arising from enterovirus, such as, acute pharyngitis, herpangina, hand-foot-and-mouth disease, and so on, are typical symptoms of highly infectious disease in recent years. Above all, enterovirus is even more life-threatening to children under five. If enterovirus can be treated at an early stage, the likelihood of developing to be severe or acute is significantly reduced. Generally, one method for pediatricians to detect the disease is to diagnose throat, hand and mouth. As patients are usually children, regular doctors can only detect if the throat mucosae have any ulcer within a limited time. Therefore, if a special light source is available, using the light source intensifies the chromatic difference between an area having pathological change and neighboring normal areas, the light source can certainly assist to enhance the detection capability of doctors. Furthermore, if the operating light source system and a charge-coupled device (CCD) can be combined, doctors can carefully examine images on a computer screen or employ pattern recognition software to promptly determine if children have contracted enterovirus. In that case, the capability of medical personnel in detecting envirovirus of children can be significantly improved.

When light sources having different spectra illuminate a diagnostic area, images with different effects are obtained. However, if various lighting equipment are provided to serve as light sources with different spectra, many problems, such as expensive hardware, maintenance and services, accommodation space, inexperienced operation of personnel, arise. Given all these problems, the approach using light sources with different spectra to test turns out to be actually infeasible.

SUMMARY OF THE INVENTION

An objective of the present invention is to provide a method for reconstructing color images varying pixels of an original digital color image with a replace spectrum of light source, thereby simulating to generate different color images affected by light source replacement for diagnostic judgment.

To achieve the foregoing objective, the method for reconstructing color images has steps of:

using a spectrum-acquiring device to acquire spectral data of a plurality of sample color blocks and calculating coefficients of a basis matrix of the sample color blocks;

obtaining digital counts of the plurality of sample color blocks with a digital camera;

obtaining a conversion matrix in accordance with the coefficients of the basis matrix and the digital counts;

acquiring digital counts of an original image with the digital camera, and generating a reconstructed image in accordance with the digital counts of the original image and the conversion matrix; and varying the conversion matrix in accordance with a new light source, and computing to generate a reconstructed image corresponding to the new light source in accordance with the digital counts of the original image and the varied conversion matrix.

Preferably, the step of obtaining a conversion matrix further comprises steps of acquiring the spectral data of the plurality of sample color blocks with the spectrum-acquiring device to acquire a set of original spectra; acquiring the spectral data of the plurality of sample color blocks with the digital camera to acquire a set of similar spectra; dividing the set of original spectra and the set of similar spectra by a spectrum of original light source to respectively acquire a set of original reflective spectra and a set of similar reflective spectra; simultaneously multiplying the set of original reflective spectra and the set of similar reflective spectra by a spectrum of new light source to generate new spectral data of the plurality of sample color blocks; and obtaining a new conversion matrix in accordance with the new spectral data of the plurality of sample color blocks.

Preferably, when calculating the coefficients of the basis matrix of the sample color blocks, the coefficients are obtained by a principal axis factor analysis method.

Preferably, when obtaining a conversion matrix in accordance with the coefficients of the basis matrix and the digital counts, the conversion matrix is obtained by a multiple linear regression analysis method.

Preferably, when acquiring the digital counts of the original image with the digital camera, the digital camera is performed by a color calibration.

Preferably, when acquiring the digital counts of the original image with the digital camera, the digital camera acquires the digital counts of the original image through color filters.

By varying the spectrum of different light source, the present invention can generate color images with different effect from images taken by a digital camera to provide desired color reconstruction effect, such as enhancement of illumination, color temperature, chromatic difference and the like of color images and desired spectrum of light source. As a result, a true light source can be easily acquired and the cost thereof is relatively reduced. When the present invention is applied to medical diagnosis or semiconductor inspection, human eyes or instrument can directly observe tissues with pathological change or defective portions of product by changing different spectrum of light source.

BRIEF DESCRIPTION OF THE DRAWINGS

FIG. 6 is a comparison table of chromatic difference values between a digital camera and a spectrophotometer;

FIG. 7 is a comparison table of chromatic difference values between a digital camera undergone color correction and a spectrophotometer;

DETAILED DESCRIPTION OF THE INVENTION

Figure 1:
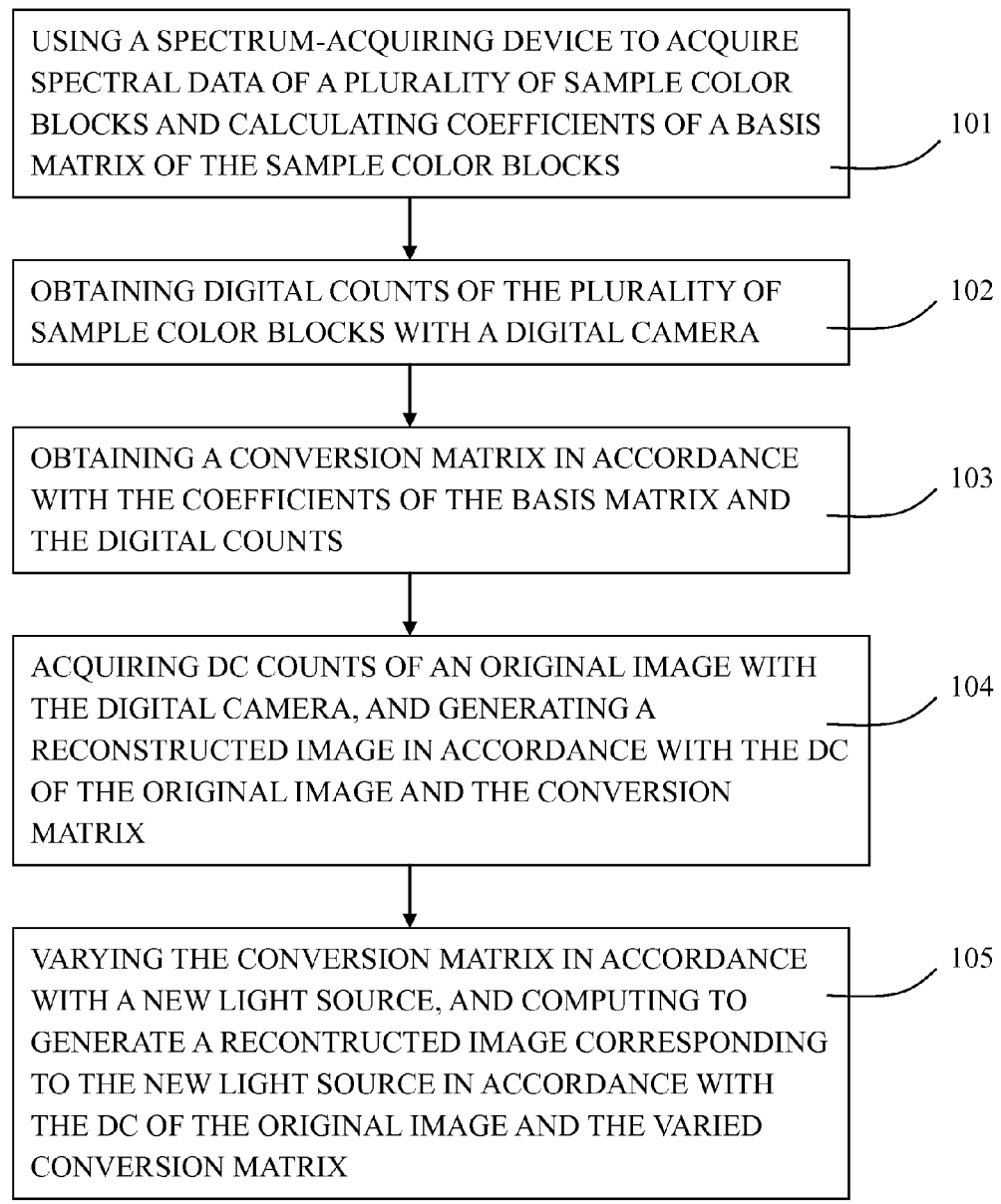
FIG. 1 is a flow diagram of a method for reconstructing color images of the present invention.

The present invention is a multi-spectral technique for color measurement and color reconstruction with high accuracy. Digital cameras available everywhere serve as sampling equipment of a multi-spectral image capturing system. Values sensed by digital cameras are taken as digital counts (Dc) of images. Several color filters are incorporated to capture images and augment fitness of similar spectra thereof. As a data value of each pixel in color images taken by digital cameras can be directly converted to those of the spectrum of any light source by the present invention, the spectral value of each pixel in reconstructed color images changes from one spectrum to another spectrum of light source. Let's introduce by focusing on the multi-spectral color reconstruction technique, principal axis factor analysis method and the multiple linear regression analysis method first.

A. Multi-spectral Color Reconstruction Technique

Color reconstruction technique is employed to duplicate images with respect to objects to be photographed or color manuscripts. Color matching is divided into spectral matching and metamerism matching. The requirement of the spectral matching is that spectral characteristic of original images and reconstructed images is consistent while that of the metamerism matching must have consistent color appearance under specific condition. If the specific condition is altered, color constancy might not be maintained. For example, color matching for applications of color printing, photography, television and the like pertains to the metamerism matching. The spectral matching of those applications is barely feasible unless subjected to a specific condition.

Multi-spectral acquisition method is first addressed in VASARI system of National Gallery, UK in 1993. The VASARI system employs a scanner collaborated with seven filters to construct a 7-channel sampling equipment for acquiring images of works of art. A sensor of the scanner is a monochrome camera with high resolution. After processing by appropriate signal processing, acquired images are stored and recorded.

Color rendering of spectral reconstruction method is to be explained next. Color rendering can be performed with respect to the spectrum of each acquired pixel. Since National Gallery successfully realizes digital archive of art images in libraries thereof, such method is also valued by some research centers, among which one famous organization is Munsell Color Science Laboratory (MCSL). As VASARI system needs to spend huge time in scanning images, MCSL proposes to employ a monochrome CCD as digital sampling equipment and seven independent filters to improve the sampling equipment in the VASARI system. MCSL experimented with identical signal processing to prove that a method like this can also achieve satisfactory result and lower the sampling time. Besides, MCSL proposes that monochrome digital sampling equipment is not mandatory. Sampling equipment using three primary colors can also achieve sufficient results.

Figure 2:
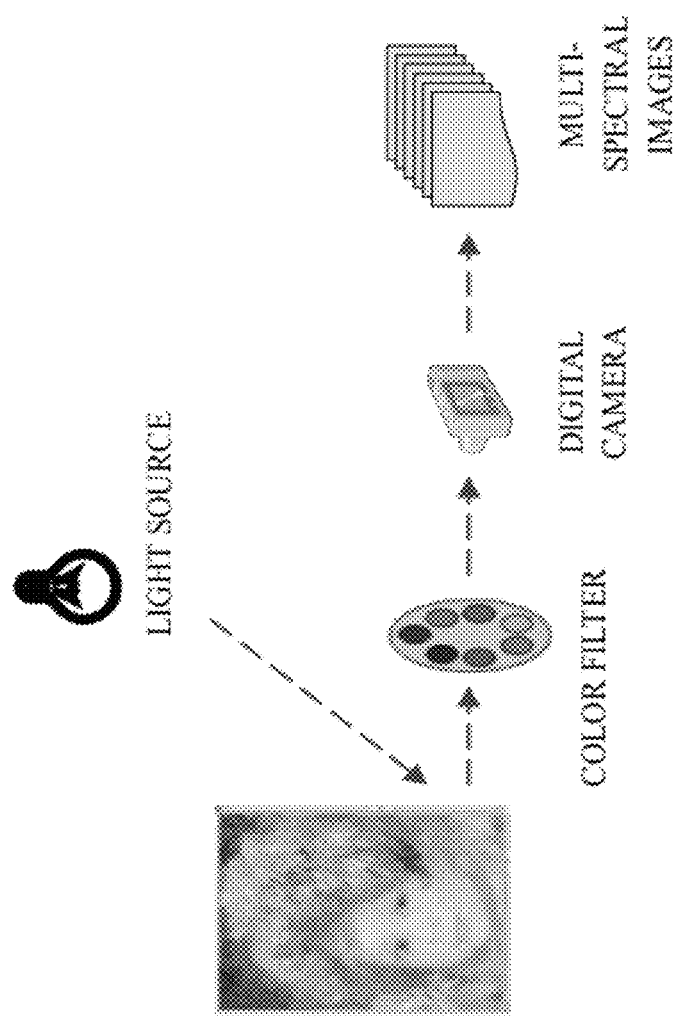
FIG. 2 is a schematic view of a process capturing multi-spectral images.
Figure 3:
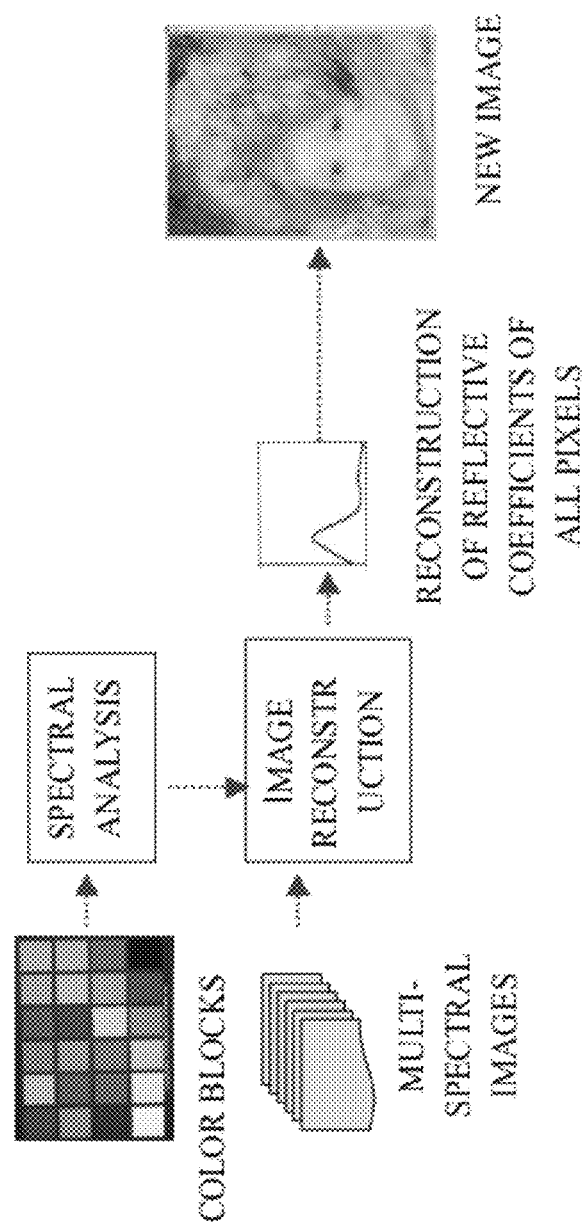
FIG. 3 is a schematic view of a process analyzing multi-spectral images and reconstructing a new image.

The multi-spectral acquisition system is divided into two parts. One part serves to acquire images, and the other part serves to perform multi-spectral analysis and spectral reconstruction. With reference to FIG. 2, the multi-spectral image acquisition process is performed by using a digital camera to take images passed through color filters under a light source, and further generating multi-spectral images through computer analysis. With reference to FIG. 3, a multi-spectral image analysis and spectral reconstruction process is performed by using a spectrophotometer to acquire sampling color blocks and combining the color blocks finished with a spectral analysis with the multi-spectral images taken by a digital camera, and lastly reconstructing a color image.

B. Principal Axis Factor Analysis Method

The principal axis factor analysis method is one commonly used method in multivariate statistics, and has become a critical sector applied in color technology since 1960. The method has two major objectives. The first one is to define a direction of a principal axis of a great quantity of spectral information, and the second one is to simplify data of the spectral information. The method mainly targets calculating highly correlated and mutually independent variables after reorganizing original information, analyzing to obtain major factors, and lastly obtaining variability applied to most data of the original information.

Figure 4:
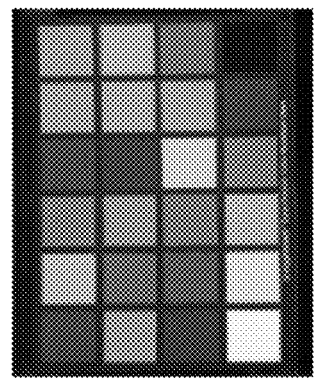
FIG. 4 is a schematic view of principal axis factor analysis method.

With reference to FIG. 4, assume that $(X_1, X_2)$ is a two-dimensional normal distribution and is attempted to be converted into another set of independent variables while still having the variability of the original data. Converting the coordinate axes of $(X_1, X_2)$ into a principal axis to convert originally correlated variables into mutually independent variables but still keeping variability of original data is the core concept of the principal axis factor analysis method.

Deduction of Principal Axis Analysis Model

Assume that there are m variables $(x_1, x_2, \ldots, x_m)$. Find coefficients $(a_1, a_2, \ldots, a_m)$ such that the value of the following expression is the maximum thereof.

$$\mathrm{Var}(a_1^* x_1 + a_2^* x_2 + \ldots + a_m^* x_m) \qquad (2\text{-}10)$$

where Var represents the variance of a vector.

Using such method can obtain the maximal variables of original data. The coefficients $(a_1, a_2, \ldots, a_m)$ must satisfy the following normalization condition.

$$(a_1^2 + a_2^2 + \ldots + a_m^2) = 1 \qquad (2\text{-}11)$$

The condition of Eqn. 2-11 introduces a set of $(a_1, a_2, \ldots, a_m)$ to make the expression 2-10 maximal and be a unit vector of a m-dimensional space. $(a_1, a_2, \ldots, a_m)$ not only represent a concept of space vector but also the direction of the principal axis. Hence, m-dimensional spatial principal axis analysis method can be expressed by the following equations:

$$PC_1 = a_{11} x_1 + a_{12} x_2 + \ldots + a_{1m} x_m$$

$$PC_2 = a_{21} x_1 + a_{22} x_2 + \ldots + a_{2m} x_m$$

$$\ldots$$

$$PC_m = a_{m1} x_1 + a_{m2} x_2 + \ldots + a_{mm} x_m \qquad (2\text{-}12)$$

where $PC_1$, $PC_2$ to $PC_m$ respectively represent a first principal axis, a second principal axis and a $m^{th}$ principal axis. The coefficients of the first principal axis $(a_{11}, a_{12}, \ldots, a_{1m})$ must satisfy Eqn. 2-11 and maximize the value of $\mathrm{Var}(a_{11}^* x_1 + a_{12}^* x_2 + \ldots + a_{1m}^* x_m)$. Likewise, the coefficients of the second principal axis to the m$^{th}$ principal axis follow the same rule, and all coefficient vectors must be orthogonal. Consequently, the coefficients ($a_{i1}$, $a_{i2}$, ..., $a_{im}$) of $PC_1$, $PC_2$ to $PC_m$ can be identified through this method, in which i is a random number. Furthermore, mathematically, the original data can be rewritten as n×n covariance matrix. The eigenvector of the covariance matrix is expressed by ($a_{i1}$, $a_{i2}$, ..., $a_{im}$), and the corresponding eigenvalues represent the variances in the expression 2-10.

The coefficients of the principal axes ($a_{i1}$, $a_{i2}$, ..., $a_{im}$) are chosen so that the first principal axis $PC_1$ has the maximal variance sufficiently interpreting most variability in the original data, and the second principal axis owns the maximum interpretation capability of variability of the original data not interpreted by the first principal axis. Usually, the original data have m variables, and m principal factors can still be identified after conversion. However, the principal axes to be identified are desirably to be as less and smaller as possible yet capable of interpreting 90% of the variability of the original data. This is the main reason why the principal axis factor analysis method is intentionally used by the present invention to analyze data.

When a group of data can be expressed by a non-square matrix and a group of random vectors X is expressed by Eqn. 2-13, the covariance matrix C can be expressed by Eqn. 2-14.

$$X=(x_1,x_2,\ldots,x_n)^T \quad (2\text{-}13)$$

$$C=E[(X-\bar{X})(X-\bar{X})^T] \quad (2\text{-}14)$$

Assume that the covariance matrix is p-dimensional. There exists p sets of basis coordinates, and assume that the n sets of basis matrix is U, which is expressed as follows:

$$U=[x_1,x_2,\ldots,x_p] \quad (2\text{-}15)$$

The values of a range mapped by variables x in the p-dimensional space are expressed as follows:

$$y=U^T X \quad (2\text{-}16)$$

Hence, a covariance matrix C' of y can be calculated as follows:

$$C' = E[(y-\bar{y})(y-\bar{y})^T] \quad (2\text{-}17)$$
$$= U^T E[(X-\bar{X})(X-\bar{X})^T]U$$
$$= U^T C U$$

New covariance matrix C' can be expressed by characteristic equation (AX=λX, where A is any one square matrix, λ is an eigenvalue, and X is an eigenvector). The expression is similar to that of Eqn. 2-18. Furthermore, the bases of the principal axes are mutually orthogonal unity vectors and can be expressed by Eqn. 2-19.

$$C'U = [C'x_1, C'x_2, \ldots, C'x_p] \quad (2\text{-}18)$$
$$= [\lambda_1 x_1, \lambda_2 x_2, \ldots, \lambda_p x_p]$$
$$= [\lambda_1, \lambda_2, \ldots, \lambda_p]\begin{bmatrix}x_1\\x_2\\\ldots\\x_p\end{bmatrix}^T$$
$$= \lambda U$$

$$U^T U = I \quad (2\text{-}19)$$

By combining Eqn. 2-18 and Eqn. 2-19, the eigenvalue $\lambda_i$ can be obtained from the characteristic equation, and the equation is expressed as follows. Therefore, the matching eigenvectors are the principal axes.

$$C'=U^T CU=\lambda$$

$$|C'-\lambda I|=0 \quad (2\text{-}20)$$

C. Multiple Linear Regression Analysis Method

Multiple linear regression analysis method is a method extensively applied to statistical analysis. Such method mainly aims at understanding if "target variables" can be expressed by linear equations of certain "independent variables" to explain characteristic of the "target variables", meaning if variables X and Y are closely related. Through the multiple linear regression analysis method, the value of Y can be obtained from the value of X.

When the present invention is applied, the spectral value of the image is obtained through computation according to the value of digital counts (Dc) of an image taken by a digital camera. Characterize the system, understand the relationship between the Dc value and the spectral value, and adopt the multiple linear regression analysis method to obtain a conversion matrix.

Prior to the multiple linear regression analysis, first need to know the relationship between the Dc of the digital camera and the spectral value of a spectrophotometer. The present invention first discusses the spectral value of the spectrophotometer. Assume that i sets of spectral data are taken, and a reflective spectrum r(λ) obtained by simplifying each set of spectral reflectance function with the principal axis factor analysis can be expressed as follows:

$$r_1(\lambda)=a_{11}x_1(\lambda)+a_{12}x_2(\lambda)+\ldots+a_{1n}x_n(\lambda)$$

$$r_2(\lambda)=a_{21}x_1(\lambda)+a_{22}x_2(\lambda)+\ldots+a_{2n}x_n(\lambda)$$

$$\ldots$$

$$r_i(\lambda)=a_{i1}x_1(\lambda)+a_{i2}x_2(\lambda)+\ldots+a_{in}x_n(\lambda) \quad (2\text{-}21)$$

where $a_n$ is a coefficient corresponding to the maximal principal factor of the first n sets of equations. The Eqn. 2-21 can be simplified and expressed as follows:

$$r=aX \quad (2\text{-}22)$$

where $$r=[r_1,r_2,\ldots,r_i]^T \quad (2\text{-}23)$$

$$a=[a_1,a_2,\ldots,a_n]=a_{in} \quad (2\text{-}24)$$

$$X=[x_1,x_2,\ldots,x_n]^T \quad (2\text{-}25)$$

On the other hand, after finishing the principal axis factor analysis of the spectrophotometer, next calculate the Dc value of the images taken by the digital camera. The Dc value can be expressed by Eqn. 2-26. The Dc value taken by the digital camera through k color filters is expressed by Eqn. 2-27.

$$Dc=\int P(\lambda)r(\lambda)S(\lambda)d\lambda \quad (2\text{-}26)$$

$$Dc_k=\int P(\lambda)r(\lambda)F_k(\lambda)S(\lambda)d\lambda \quad (2\text{-}27)$$

where S(λ) is a sensitivity distribution matrix of the digital camera, P(λ) is a distribution matrix of a spectrum of a light source, r(λ) is a distribution matrix of a reflective spectrum of an object, and $F_k(\lambda)$ is a distribution matrix of a spectrum of the color filters. Besides, to simplify Eqn. 2-27, assume D(λ) to be Eqn. 2-28, and substitute that into Eqn. 2-27 to obtain Eqn. 2-29.

$$D(\lambda) = \int P(\lambda)F_m(\lambda)S(\lambda)d\lambda \quad (2\text{-}28)$$

$$Dc_k = r(\lambda)D(\lambda) \quad (2\text{-}29)$$
$$= rD$$

Substitute Eqn. 2-22 into Eqn. 2-29 to obtain Eqn. 2-30. Further combine XD as a constant matrix $m_k$ to obtain Eqn. 2-31.

$$Dc_k = aXD \quad (2\text{-}30)$$

$$a = m_k Dc_k \quad (2\text{-}31)$$

From the aforementioned principal axis factor analysis, a is the coefficient corresponding to the maximal principal factor of the first n sets of equations in the principal axis factor analysis, and Dc is the value of the digital camera. From Eqn. 2-31, a conversion matrix $m_k$ exists between the spectrophotometer and the digital camera. The multiple linear regression analysis method can be used to obtain the conversion matrix.

With reference to FIG. 1, the present invention has steps of:
using a spectrum-acquiring device to acquire spectral data of a plurality of sample color blocks and calculating coefficients of a basis matrix of the sample color blocks (101);
obtaining digital counts of the plurality of sample color blocks with a digital camera (102);
obtaining a conversion matrix in accordance with the coefficients of the basis matrix and the digital counts (103);
acquiring Dc counts of an original image with the digital camera, and generating a reconstructed image in accordance with the Dc of the original image and the conversion matrix (104); and
varying the conversion matrix in accordance with a new light source, and computing to generate a reconstructed image corresponding to the new light source in accordance with the Dc of the original image and the varied conversion matrix (105).

Figure 5:
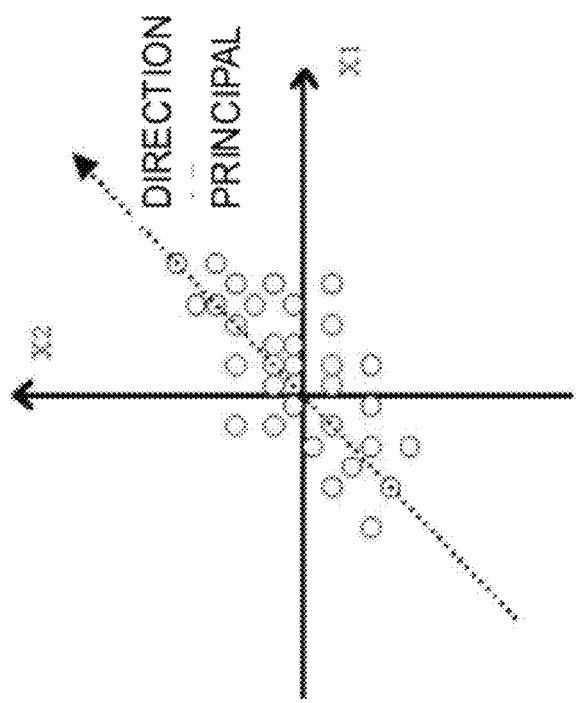
FIG. 5 is a schematic view of 24-color sample color blocks.

With reference to FIG. 5, first use a spectrum-acquiring device, such as a spectrophotometer (MINOLTA CS1000A) to measure the spectral data of the sample color blocks. In the embodiment, adopt 24-color sample color blocks, and measure multiple sets of data separated by a gap of 2 nm. Hence, totally, there are 201 spectral samples, The measured spectral sample of a single color block can be expressed in the form of vector and matrix as follows:

$$Sr(\lambda) = [Sr(\lambda_1), Sr(\lambda_2), Sr(\lambda_3) \ldots, Sr(\lambda_m)] \quad (3\text{-}1)$$

where m=201.

Moreover, the measured 24-color sample color blocks can be expressed as follows:

$$Sr_i(\lambda) = A \quad (3\text{-}2)$$

$$= \begin{bmatrix} Sr_1(\lambda_1), & Sr_1(\lambda_2), & Sr_1(\lambda_3), & \ldots, & Sr_1(\lambda_{201}) \\ Sr_2(\lambda_1), & Sr_2(\lambda_2), & Sr_2(\lambda_3), & \ldots, & Sr_2(\lambda_{201}) \\ \ldots & \ldots & \ldots & & \ldots \\ \ldots & \ldots & \ldots & & \ldots \\ Sr_{24}(\lambda_1), & Sr_{24}(\lambda_2), & Sr_{24}(\lambda_3), & \ldots, & Sr_{24}(\lambda_{201}) \end{bmatrix}$$

where i=1~24.

After obtaining the 24 sets of spectral data, next use the principal axis factor analysis method to analyze. After the principal axis factor analysis, obtain a set of principal factors as shown in Eqn. 3-3. These factors can be treated as basis functions to linearly combine all spectral data as shown in Eqn. 3-4.

$$X = [x_1(\lambda_1), x_2(\lambda_2), \ldots, x_{201}(\lambda_{201})]^T \quad (3\text{-}3)$$

$$Sr_i(\lambda) = \alpha_1 x_1(\lambda_1) + \alpha_2 x_2(\lambda_2) + \ldots + \alpha_{201} x_{201}(\lambda_{201}) \quad 3\text{-}4$$

where $\alpha_m$ represents the coefficient corresponding to each basis function.

As $Sr_i(\lambda)$ is not a square matrix, need to use a pseudo inverse to calculate. First let $A^T A$ is a covariance matrix, and use a characteristic function $(BX_m = \delta_m X_m)$ to obtain an eigenvector, where $\delta_m$ is an eigenvalue, $X_m$ is an eigenvector, as shown in the following equations.

Let $B = A^T A$, then $$BX_m = \delta_m X_m, m = 1 \sim 201 \quad (3\text{-}5)$$

After the calculation of Eqn. 3-5, obtain 201 eigenvalues and corresponding 201 sets of eigenvectors. The principal axis factor analysis method targets at identifying few sets of maximal eigenvector to constitute the principal factors of the spectral data, and use few factors to simulate the original spectrum. After having data of the characteristic functions, start the principal axis factor analysis. Before selecting the first few maximal eigenvalues for the principal factors (eigenvectors), calculate accumulated growth ratio expressed by Eqn. 3-6.

$$C = \frac{\sum_{m}^{k} \sqrt{\delta_m}}{\sum_{m}^{201} \sqrt{\delta_m}} \quad (3\text{-}6)$$

According to Eqn. 3-6, calculate the comparison between the number of eigenvectors and the accumulated growth ratio as shown in Table 3-1.

TABLE 3-1

| No. of eigenvector | Accumulated growth ratio (%) |
| --- | --- |
| 1 | 84.87 |
| 2 | 94.59 |
| 3 | 99.10 |
| 4 | 99.61 |
| 5 | 99.84 |
| 6 | 99.90 |
| 7 | 99.94 |
| 8 | 99.97 |
| 9 | 99.983 |
| 10 | 99.99 |

From Table 3-1, when the number of eigenvectors is or more than 6 sets, the accumulated growth ratio can be 99.9% and up, meaning that six sets or more of eigenvectors can represent the original spectrum. Therefore, the present invention employs the first six sets of eigenvectors as the basis functions of the spectrum. From the accumulated growth ratio, when selecting the first six eigenvectors as the basis function of the reconstructed spectrum, the basis function vector is expressed as follows:

$$X_n = \begin{bmatrix} X_n(\lambda_1) \\ X_n(\lambda_2) \\ X_n(\lambda_3) \\ \ldots \\ \ldots \\ X_n(\lambda_{201}) \end{bmatrix}, \quad (3\text{-}7)$$

for $n = 1 \sim 6$

After obtaining the first six sets of eigenvectors as the basis function, linearly combine all data of the original spectral data. For example, the first set of data can be expressed by Eqn. 3-8.

$$Sr_1(\lambda) = \begin{bmatrix} Sr_1(\lambda_1) \\ Sr_2(\lambda_2) \\ \ldots \\ \ldots \\ Sr_{201}(\lambda_{201}) \end{bmatrix} \quad (3\text{-}8)$$

$$= \alpha_1 \begin{bmatrix} x_1(\lambda_1) \\ x_1(\lambda_2) \\ \ldots \\ \ldots \\ x_1(\lambda_{201}) \end{bmatrix} + \alpha_2 \begin{bmatrix} x_2(\lambda_1) \\ x_2(\lambda_2) \\ \ldots \\ \ldots \\ x_2(\lambda_{201}) \end{bmatrix} + \ldots + \alpha_i \begin{bmatrix} x_6(\lambda_1) \\ x_6(\lambda_2) \\ \ldots \\ \ldots \\ x_6(\lambda_{201}) \end{bmatrix}$$

where $\alpha_i$ represents the coefficient ahead an unknown linear combination.

Further use 24 sets as an example to generate Eqn. 3-9 which can be further simplified as Eqn. 3-10.

$$Sr_i(\lambda) = \begin{bmatrix} Sr_1(\lambda_1), & Sr_1(\lambda_2), & Sr_1(\lambda_3), & \ldots, & Sr_1(\lambda_{201}) \\ Sr_2(\lambda_1), & Sr_2(\lambda_2), & Sr_2(\lambda_3), & \ldots, & Sr_2(\lambda_{201}) \\ \ldots & \ldots & \ldots & & \ldots \\ \ldots & \ldots & \ldots & & \ldots \\ Sr_{24}(\lambda_1), & Sr_{24}(\lambda_2), & Sr_{24}(\lambda_3), & \ldots, & Sr_{24}(\lambda_{201}) \end{bmatrix} \quad (3\text{-}9)$$

$$= \begin{bmatrix} \alpha_{1(1)}, & \alpha_{1(2)}, & \ldots, & \alpha_{1(6)} \\ \alpha_{2(1)}, & \alpha_{2(2)}, & \ldots, & \alpha_{2(6)} \\ \ldots & \ldots & & \ldots \\ \ldots & \ldots & & \ldots \\ \alpha_{24(1)}, & \alpha_{24(2)}, & \ldots, & \alpha_{24(6)} \end{bmatrix} \begin{bmatrix} x_1(\lambda_1), & x_1(\lambda_2), & \ldots, & x_1(\lambda_{201}) \\ x_2(\lambda_1), & x_2(\lambda_2), & \ldots, & x_2(\lambda_{201}) \\ \ldots & \ldots & & \ldots \\ \ldots & \ldots & & \ldots \\ x_6(\lambda_1), & x_6(\lambda_2), & \ldots, & x_6(\lambda_{201}) \end{bmatrix}$$

$$Sr_i(\lambda) = \alpha_{(i)n} \times (X_n)^T, \quad (3\text{-}10)$$

for $n = 1 \sim 6$, $i = 1 \sim 24$

The dimension of the original eigenvectors is 201. After the principal axis factor analysis, the dimension is reduced to 6. As $X_n$ is not a square matrix, the corresponding coefficient $\alpha$ is obtained through a pseudo inverse as expressed by Eqn. 3-11. The coefficients of the 24 color blocks are summarized as follows:

$$\alpha_{(i)n} = Sr_i(\lambda) \times [(X_n)^T]^{-1} \quad (3\text{-}11)$$

where $\alpha_1 \times 10-4$, $i=\sim 6$

After using the principal axis factor analysis to obtain the coefficients $\alpha$ of the first six set of eigenvectors, perform multiple linear regression analysis to the Dc values taken by the digital camera to obtain a conversion matrix between different systems.

Obtain the Dc values of the digital camera from the foregoing description, and combine the Dc values of the digital camera with Eqn. 3-10 to form Eqn. 3-12.

$$\alpha_{n(i)} = m_{n(k)} \times Dc_{k(i)} \quad (3\text{-}12)$$

where $n=1\sim6$, $I=1\sim24$, and $k=1\sim3$.

Eqn. 3-12 can be expressed in a matrix form as Eqn. 3-13 to calculate the conversion matrix m.

$$\begin{bmatrix} \alpha_{1(1)}, & \alpha_{2(1)}, & \ldots, & \alpha_{24(1)} \\ \alpha_{1(2)}, & \alpha_{2(2)}, & \ldots, & \alpha_{24(2)} \\ \ldots & \ldots & & \ldots \\ \ldots & \ldots & & \ldots \\ \alpha_{1(6)}, & \alpha_{2(6)}, & \ldots, & \alpha_{24(6)} \end{bmatrix} = \quad (3\text{-}13)$$

$$\begin{bmatrix} m_{1(1)}, & m_{2(1)}, & \ldots, & m_{3(1)} \\ m_{1(2)}, & m_{2(2)}, & \ldots, & m_{3(2)} \\ \ldots & \ldots & & \ldots \\ \ldots & \ldots & & \ldots \\ m_{1(6)}, & m_{2(6)}, & \ldots, & m_{3(6)} \end{bmatrix} \begin{bmatrix} Dc_{1(1)}, Dc_{2(1)}, \ldots, Dc_{24(1)} \\ Dc_{1(2)}, Dc_{2(2)}, \ldots, Dc_{24(2)} \\ Dc_{1(3)}, Dc_{2(3)}, \ldots, Dc_{24(3)} \end{bmatrix}$$

The spectrum can be reconstructed based on the calculated conversion matrix m.

Actual Measurement Examples

The present invention employs CANON 860 is digital camera as sampling equipment. There are two tasks upon measuring. One task goes through no color filter, and the other task goes through six color filters. The selected six color filters have a transmittance of 30% for red, green, blue, cyan, magenta, and yellow light, respectively.

The Dc values acquired by using the digital camera to photograph the 24 sample color blocks are expressed by Table 2.

TABLE 2

| Patch | R | G | B |
|---|---|---|---|
| 1 | 104.08 | 66.411 | 54.813 |
| 2 | 201.83 | 155.7 | 142.88 |
| 3 | 114.84 | 139.35 | 182.09 |
| 4 | 95.15 | 112.88 | 64.94 |
| 5 | 155.88 | 153.47 | 202.82 |
| 6 | 133.79 | 195.34 | 193.77 |
| 7 | 190.99 | 114.91 | 37.858 |
| 8 | 80.117 | 109.12 | 185.45 |
| 9 | 207.67 | 98.618 | 112.48 |
| 10 | 100.82 | 64.912 | 117.44 |
| 11 | 168.33 | 198.68 | 78.457 |
| 12 | 205.31 | 164.18 | 53.654 |
| 13 | 38.078 | 63.097 | 149.52 |
| 14 | 79.889 | 150.62 | 83.039 |
| 15 | 193.97 | 58.711 | 73.967 |
| 16 | 219.7 | 200.96 | 72.81 |
| 17 | 210.81 | 104.7 | 171.05 |
| 18 | 73.928 | 150.3 | 199.81 |
| 19 | 227.59 | 225.94 | 228.03 |
| 20 | 207 | 205.45 | 208.7 |
| 21 | 178.78 | 175.71 | 180.64 |
| 22 | 141.1 | 140.57 | 145.04 |
| 23 | 88.684 | 89.358 | 93.089 |
| 24 | 37.341 | 38.522 | 38.997 |

The coefficients of the first six sets of basis functions of the sample color blocks measured by the spectrophotometer are listed as in Table 3.

TABLE 3

| Patch | α1 | α2 | α3 | α4 | α5 | α6 |
|---|---|---|---|---|---|---|
| 1 | −0.6723 | 0.1118 | 0.5625 | 1.6133 | −4.8543 | 18.270 |
| 2 | −1.7122 | 3.2687 | 0.0853 | 4.7085 | −11.328 | 67.173 |
| 3 | −0.7310 | −0.6049 | 1.4018 | 5.9270 | 20.077 | 40.559 |
| 4 | 0.6744 | −2.1668 | −1.7588 | −6.3965 | 0.1159 | 20.868 |
| 5 | −0.0247 | −2.9428 | 1.7070 | 13.964 | 18.983 | 57.203 |
| 6 | −0.9590 | 0.3607 | −6.9596 | −13.680 | 26.902 | 67.953 |
| 7 | −2.2466 | 3.2048 | 7.5213 | 1.9661 | −30.202 | 51.268 |
| 8 | −1.4700 | −4.4197 | 3.8500 | 13.346 | 22.860 | 34.135 |
| 9 | −1.4106 | 4.2025 | −0.4818 | 18.274 | −24.391 | 47.891 |
| 10 | −4.6785 | −7.7265 | −1.3346 | 11.473 | 0.3157 | 21.199 |
| 11 | −0.9082 | −3.9695 | −6.7682 | −27.958 | −8.4103 | 61.083 |
| 12 | −1.3483 | −0.8906 | 9.6877 | −10.747 | −32.743 | 66.842 |
| 13 | 1.4111 | −1.7274 | 4.5895 | 10.296 | 17.891 | 19.922 |
| 14 | −1.2473 | 0.1020 | −6.0084 | −15.582 | 5.3700 | 28.320 |
| 15 | 1.2031 | 0.6855 | −11.3066 | 24.043 | −33.293 | 40.404 |
| 16 | 1.1547 | −1.9846 | −1.3881 | −22.084 | −37.591 | 89.291 |
| 17 | 1.5127 | −3.0763 | −4.3986 | 32.295 | −16.284 | 60.110 |
| 18 | −3.1543 | 7.3086 | −4.7347 | 3.6128 | 30.537 | 41.791 |
| 19 | 2.1356 | 1.6207 | 2.3801 | −2.1104 | 20.022 | 151.79 |
| 20 | 1.6075 | 0.4445 | 2.2658 | −0.7335 | 16.250 | 102.02 |
| 21 | 1.0377 | 0.2140 | 1.8616 | −0.3239 | 10.260 | 63.040 |
| 22 | 0.6697 | 0.0252 | 1.1264 | −0.3098 | 6.6471 | 36.000 |
| 23 | 0.3190 | −0.0989 | 0.5747 | 0.0034 | 3.3792 | 16.984 |
| 24 | 0.0615 | −0.0542 | 0.1616 | 0.0778 | 1.0591 | 5.9856 |

According to Eqn. 3-13, the conversion matrix of the system can be calculated as listed in Table 4.

TABLE 4

| | | |
|---|---|---|
| 0.000000398 | −0.000000428 | −0.000000105 |
| −0.000001141 | 0.000001919 | −0.000000752 |
| −0.000001256 | 0.000002503 | −0.000001204 |
| 0.000061688 | −0.000062193 | 0.000000114 |
| −0.000027045 | 0.000024268 | 0.000002589 |
| 0.000022440 | 0.000019460 | −0.000001860 |

To further provide the digital camera with better shooting effect, a color calibration step can be performed to the camera. The standard of the color calibration is to match the RGB values of the 24-color sample color blocks taken by the spectrophotometer (CS1000A) with the Dc values of the digital camera. The way of calibration mainly obtain Gamma curve diagrams of the RGB values of the six sets of gray level color blocks on the lowest row of the sample color blocks taken by the digital camera and the spectrophotometer. By respectively setting the digital camera and the spectrophotometer as the horizontal axis and the vertical axis, obtain a regression equation. Lastly map the values of the 24 color blocks taken by the camera to those measured by the spectrophotometer to obtain a new set of camera data. Given the Gamma curve diagrams of the spectrophotometer and the camera, RGB color calibration of the camera and the spectrophotometer can be performed. The calibrated Dc values of the camera are listed on Table 5, and the new conversion matrix thereof is listed in Table 6.

TABLE 5

| Patch | R | G | B |
|---|---|---|---|
| 1 | 57 | 40 | 19 |
| 2 | 190 | 121 | 102 |
| 3 | 66 | 100 | 157 |
| 4 | 52 | 66 | 28 |
| 5 | 118 | 119 | 193 |
| 6 | 90 | 183 | 175 |
| 7 | 170 | 68 | 0 |
| 8 | 45 | 62 | 162 |
| 9 | 204 | 55 | 67 |
| 10 | 55 | 39 | 72 |
| 11 | 125 | 189 | 39 |
| 12 | 198 | 134 | 18 |
| 13 | 0 | 39 | 109 |
| 14 | 45 | 115 | 44 |
| 15 | 175 | 36 | 36 |
| 16 | 229 | 194 | 35 |
| 17 | 210 | 59 | 138 |
| 18 | 43 | 114 | 187 |
| 19 | 252 | 254 | 255 |
| 20 | 202 | 204 | 205 |
| 21 | 151 | 153 | 154 |
| 22 | 100 | 102 | 104 |
| 23 | 48 | 50 | 52 |
| 24 | 0 | 0 | 0 |

TABLE 6

| | | |
|---|---|---|
| 0.0000008 | 0.0000000 | −0.0000007 |
| 0.0000055 | −0.0000055 | 0.0000000 |
| 0.0000091 | −0.0000096 | 0.0000002 |
| 0.0001389 | −0.0001640 | 0.0000266 |
| −0.0001768 | 0.0000847 | 0.0001032 |
| 0.0001338 | 0.0000343 | 0.0000089 |

With reference to FIG. 6, chromatic difference tables associated with sample color blocks taken by the digital camera prior to no color calibration and those taken by the spectrophotometer are shown for comparison. These chromatic difference tables are obtained by the chromatic difference equation in the laboratory. On the other hand, with reference to FIG. 7, the chromatic difference tables after the color calibration are shown for comparison. From FIGS. 6 and 7, the average chromatic difference after the color calibration is less than that prior to the color calibration, indicating that the digital camera is feasible equipment to photograph.

Figure 8:
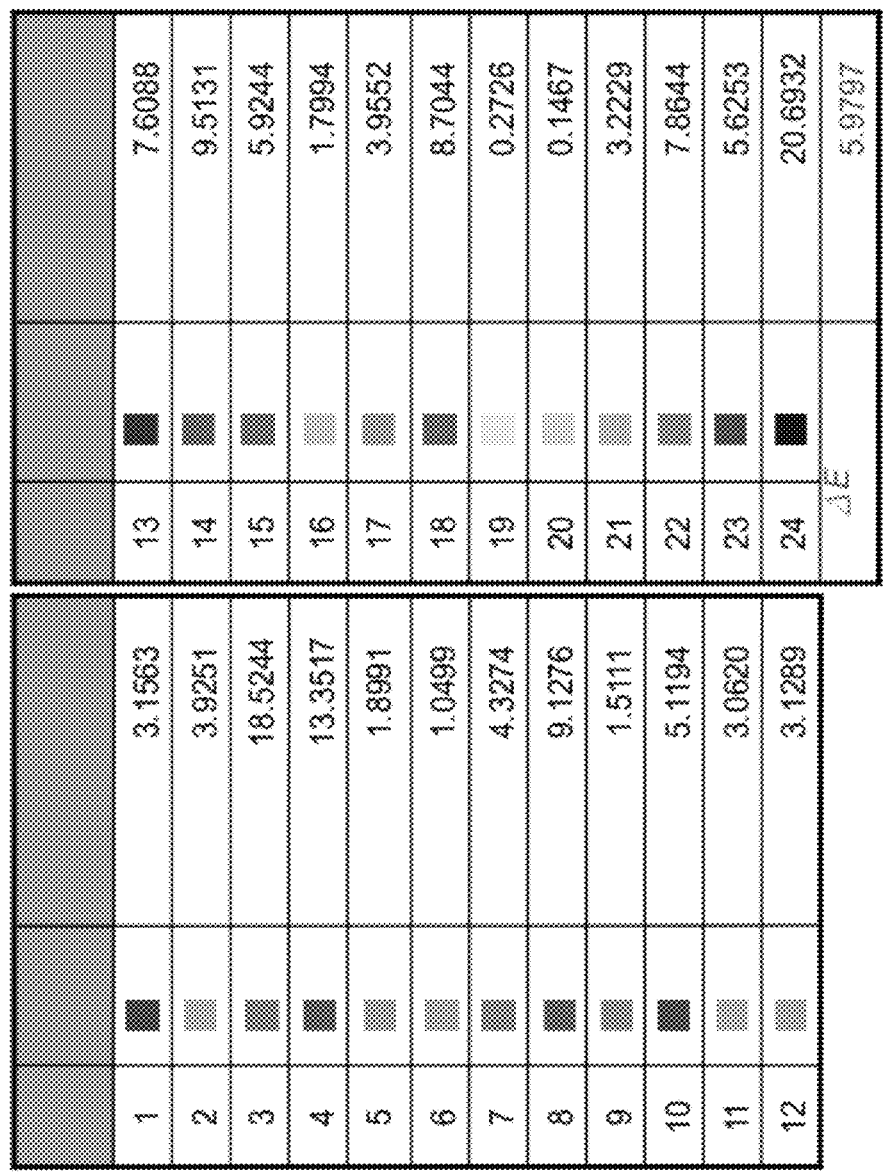
FIG. 8 is a comparison table of chromatic difference values between a digital camera undergone color correction and processed by color filter and a spectrophotometer.

With reference to FIG. 8, if the digital camera finished with the color calibration is further combined with color filters for shooting, the average chromatic difference can be dropped to an even lower value 5.9797.

One actual application of the present invention employs a regular three RGB digital camera to shoot a biological image to be determined, and intensifies the chromatic difference and contrast between a normal area and an area with pathological change of the biological image by varying light source.

First take the spectra of the 24-color sample color blocks with the spectrophotometer and the digital camera to respectively acquire a set of original spectra and a similar spectra. The two spectra are simultaneously divided by the spectrum of the original light source taken in the same laboratory environment to acquire a set of original reflective spectra and a set of similar reflective spectra. Subsequently, the set of original reflective spectra and the set of similar reflective spectra are simultaneously multiplied by a spectrum of a new light source to be replaced to obtain a new set of spectra of the 24-color sample color blocks. A conversion matrix after the light source is replaced can be obtained. In other words, as long as the spectrum of light source varies, new conversion matrix will be available to the generation of new images corresponding to the new light source.

Figure 9:
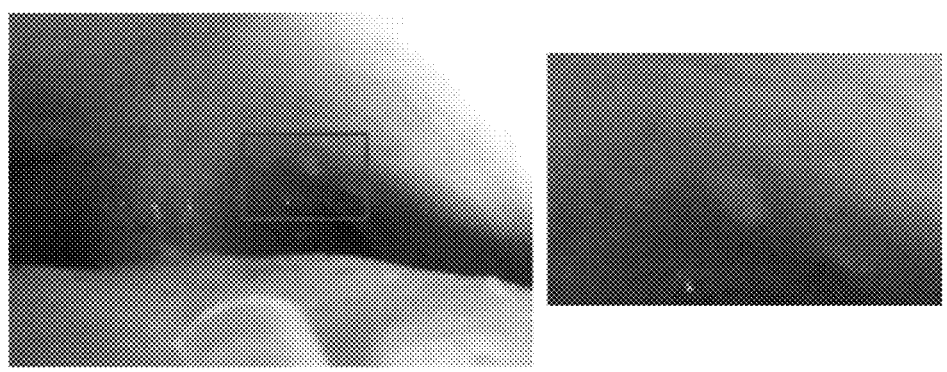
FIG. 9 is an original image of ulcer in oral cavity illuminated by a LED flashlight.
Figure 10A:
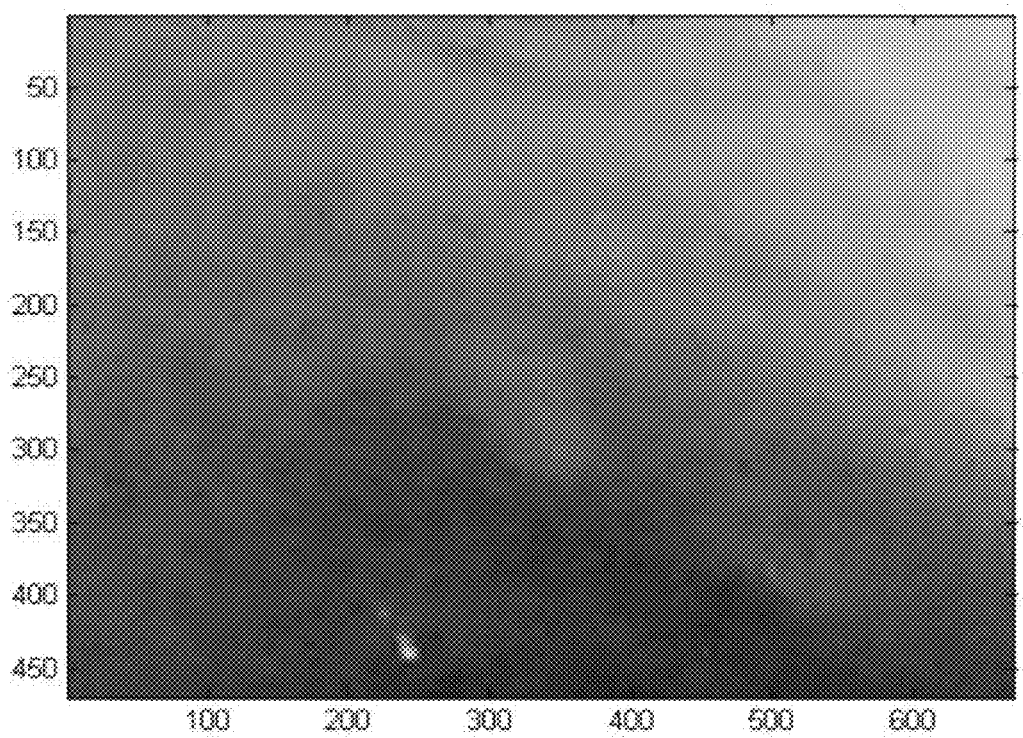
FIG. 10 is oral cavity image illuminated by a yellow flashlight and a bluish LED light source collaborated with different color filters.
Figure 10B:
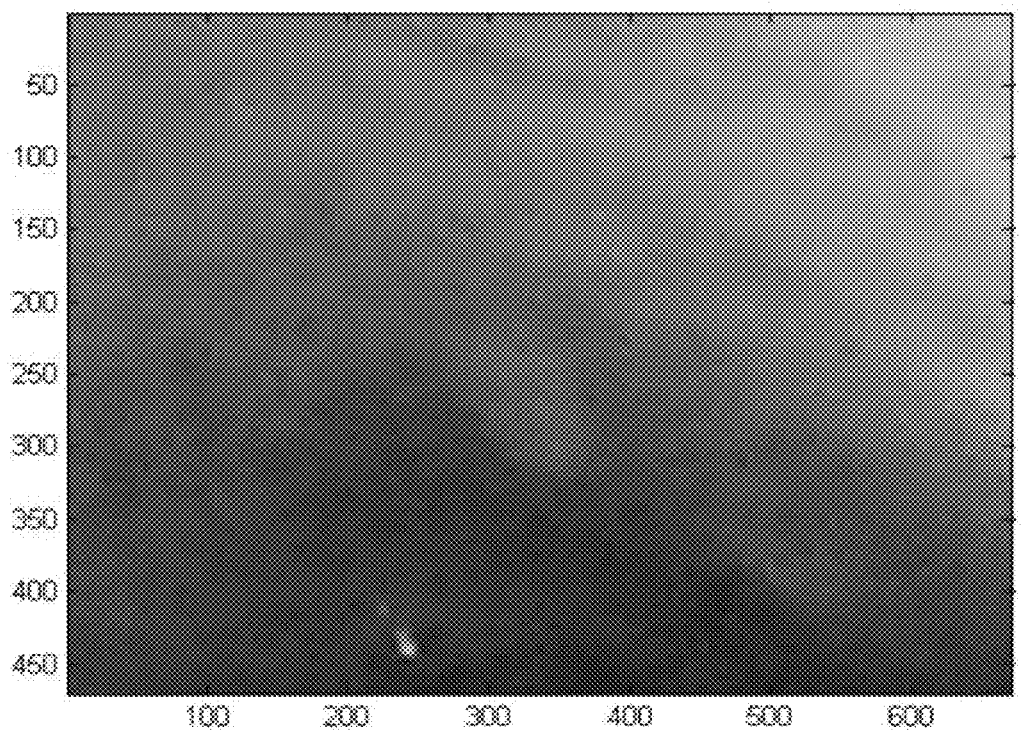
Figure 10C:
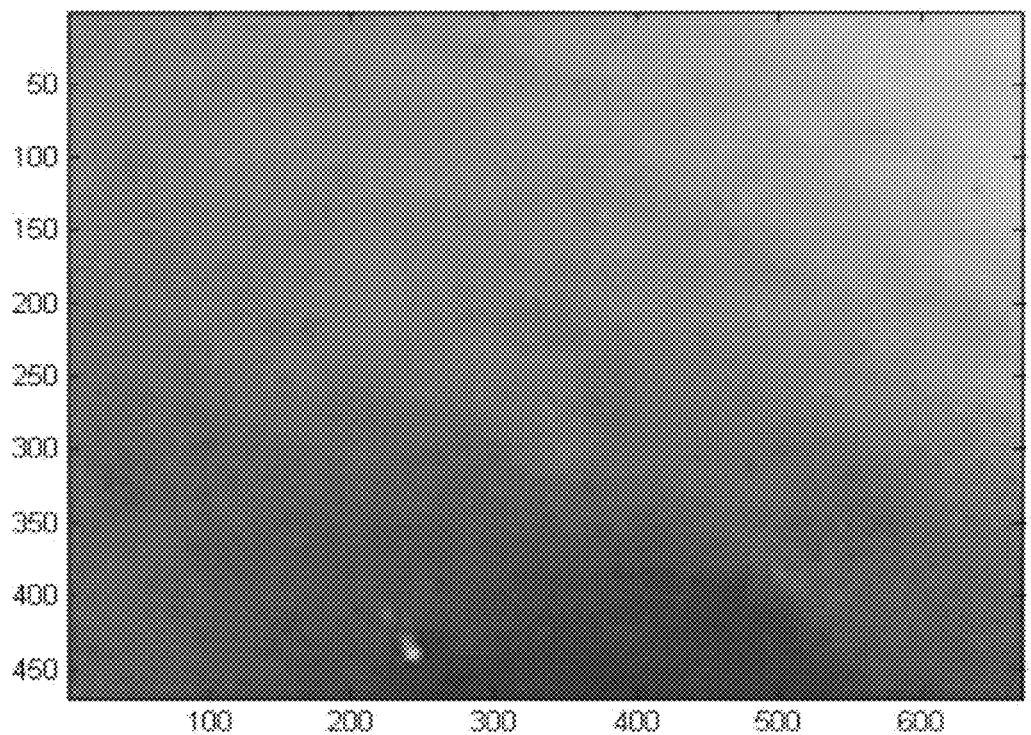
Figure 10D:
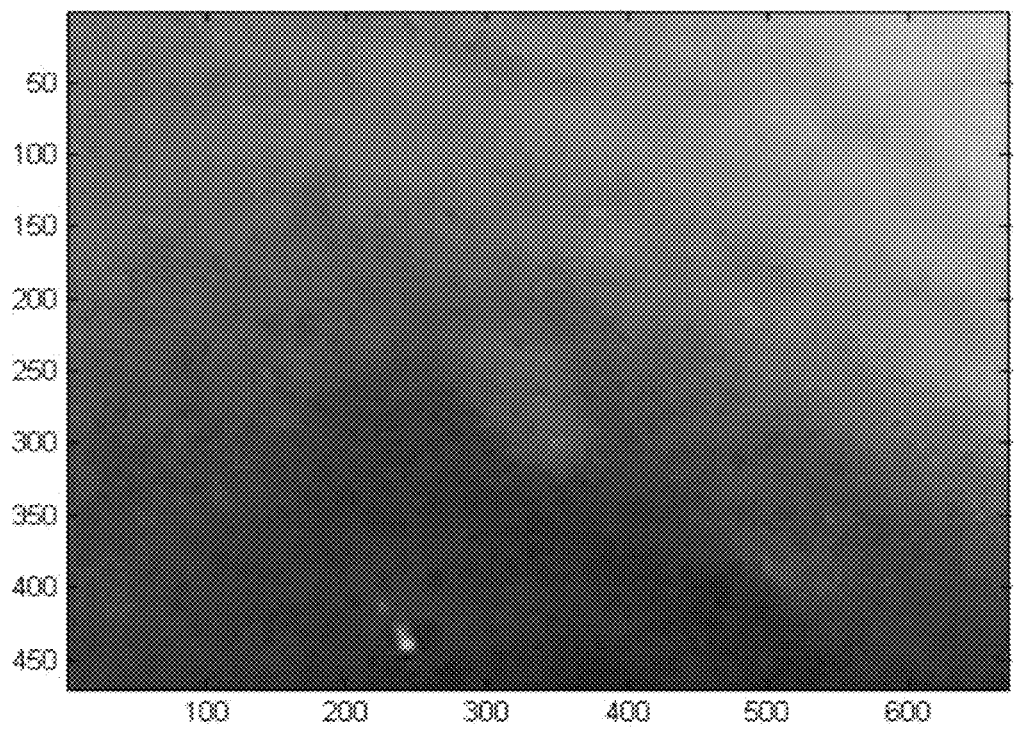
Figure 10E:
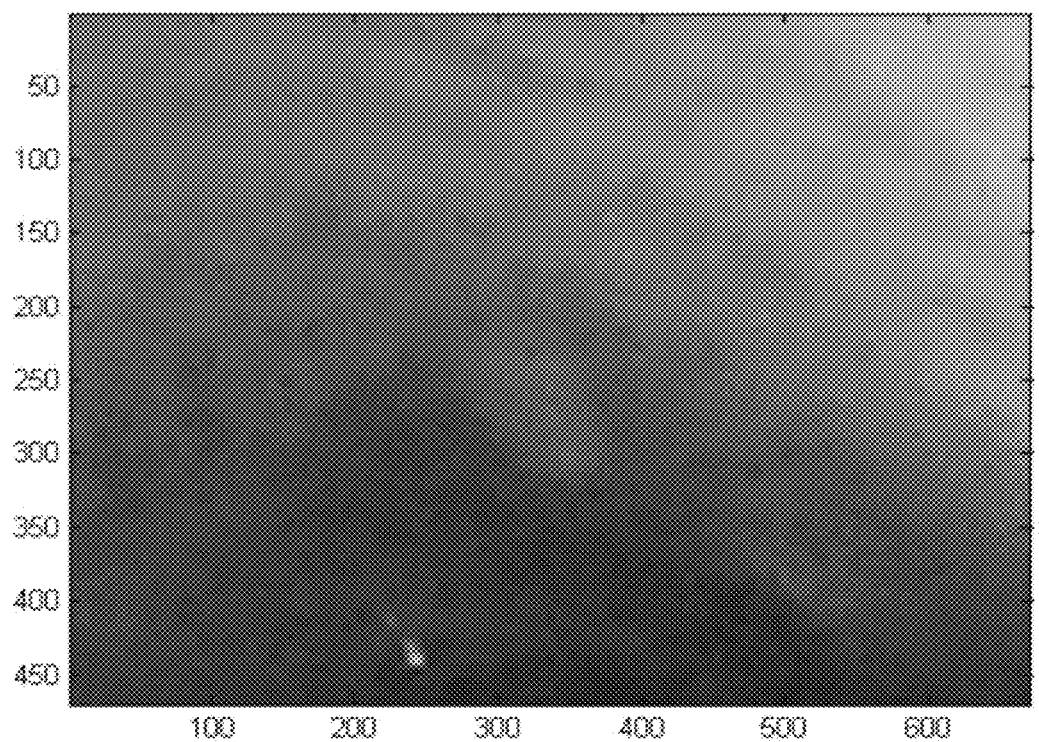
Figure 10F:
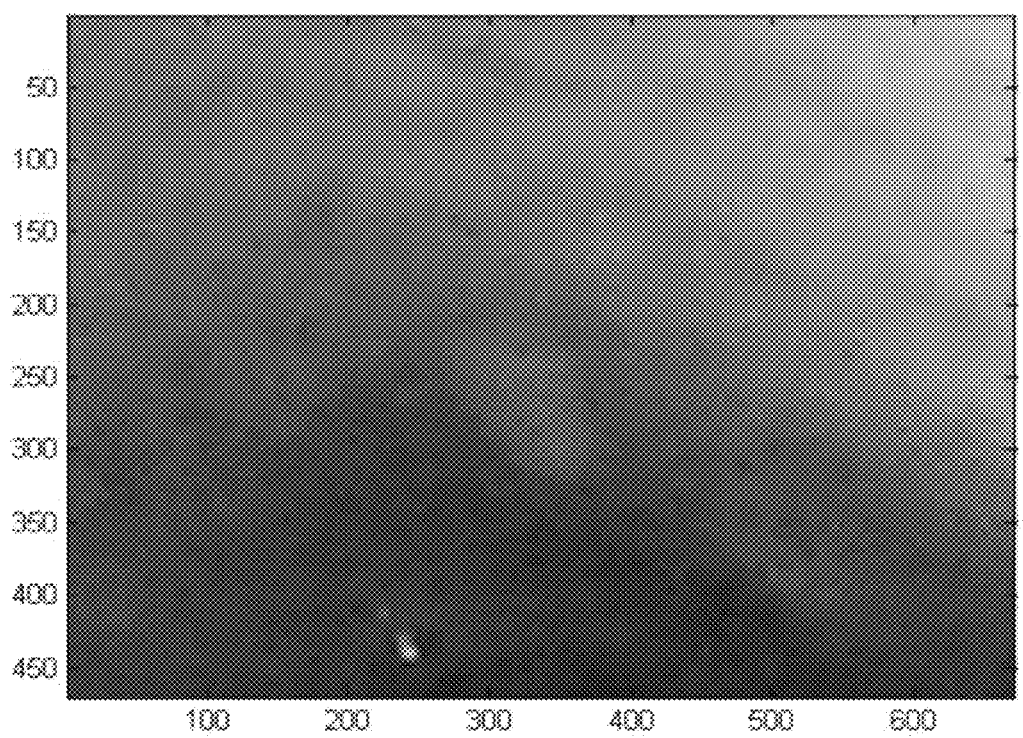

With reference to FIG. 9, a fluorescent light is employed to illuminate ulcer inside an oral cavity to capture a concerned area. The resolution of the captured image is 470×672. With reference to FIG. 10, images of oral cavity illuminated by other replaced light sources on a basis of FIG. 9. What FIG. 9 displays pertains to reconstructed images of oral cavity adopting the spectrum of a bluish white LED light source and different color filters. All images in FIG. 10 are explained as follows:

(A) The light source is the yellow lighting device. As yellow lighting devices are broadband light sources, color rendering thereof is relatively higher. So, the chromatic difference between the area having pathological change and normal tissue is not significant.

(B) The light source is the bluish white LED. As signals of blue spectral band are stronger, color rendering thereof is worse than broadband light sources. So, the chromatic difference between the area having pathological change and normal tissue is not as noticeable as in 2(A).

(C) The light source is the bluish white LED collaborated with a red filter. The oral image becomes more reddish. The oral image originally appears to be red, adding that the incorporated red filter makes the color of the oral image even more saturated. So, the area having pathological change is not easy to be recognized by naked eye.

(D) The light source is the bluish white LED collaborated with the green filter. The color of the area having pathological change is clearly noticed to be dark red. As the spectral band of the area having pathological change has higher light absorption, the color thereof is somewhat dull.

(E) and (F) The light sources are the bluish white LED collaborated with the blue filter and the bluish white LED collaborated with the yellow filter respectively. Due to the addition of the blue filter, the normal portion around the area having pathological change appears to be more white. As the background color of the oral tissue pertains to be a more reddish spectral band, wavelength difference between the red spectral band and the blue spectral band due to the addition of the blue filter is greater than that between the red spectral band and the yellow spectral band. The visual distinction is generated accordingly.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for reconstructing color images, comprising steps of:
    using a spectrum-acquiring device to acquire spectral data of a plurality of sample color blocks and calculating coefficients of a basis matrix of the sample color blocks;
    obtaining digital counts of the plurality of sample color blocks with a digital camera;
    obtaining a conversion matrix in accordance with the coefficients of the basis matrix and the digital counts;
    acquiring digital counts of an original image with the digital camera, and generating a reconstructed image in accordance with the digital counts of the original image and the conversion matrix; and
    varying the conversion matrix in accordance with a new light source, and computing to generate a reconstructed image corresponding to the new light source in accordance with the digital counts of the original image and the varied conversion matrix.

2. The method for reconstructing color images as claimed in claim 1, wherein the step of obtaining a conversion matrix further comprises steps of:
    acquiring the spectral data of the plurality of sample color blocks with the spectrum-acquiring device to acquire a set of original spectra;
    acquiring the spectral data of the plurality of sample color blocks with the digital camera to acquire a set of similar spectra;
    dividing the set of original spectra and the set of similar spectra by a spectrum of original light source to respectively acquire a set of original reflective spectra and a set of similar reflective spectra;
    simultaneously multiplying the set of original reflective spectra and the set of similar reflective spectra by a spectrum of new light source to generate new spectral data of the plurality of sample color blocks; and
    obtaining a new conversion matrix in accordance with the new spectral data of the plurality of sample color blocks.

3. The method for reconstructing color images as claimed in claim 1, wherein when calculating the coefficients of the basis matrix of the sample color blocks, the coefficients are obtained by a principal axis factor analysis method.

4. The method for reconstructing color images as claimed in claim 2, wherein when calculating the coefficients of the basis matrix of the sample color blocks, the coefficients are obtained by a principal axis factor analysis method.

5. The method for reconstructing color images as claimed in claim 1, wherein when obtaining a conversion matrix in accordance with the coefficients of the basis matrix and the digital counts, the conversion matrix is obtained by a multiple linear regression analysis method.

6. The method for reconstructing color images as claimed in claim 2, wherein when obtaining a conversion matrix in accordance with the coefficients of the basis matrix and the digital counts, the conversion matrix is obtained by a multiple linear regression analysis method.

7. The method for reconstructing color images as claimed in claim 1, wherein when acquiring the digital counts of the original image with the digital camera, the digital camera is performed by a color calibration.

8. The method for reconstructing color images as claimed in claim 1, wherein when acquiring the digital counts of the original image with the digital camera, the digital camera acquires the digital counts of the original image through color filters.

* * * * *